United States Patent
Zhang et al.

(10) Patent No.: US 12,524,697 B2
(45) Date of Patent: Jan. 13, 2026

(54) QUBIT ASSEMBLY PREPARATION METHOD, QUBIT ASSEMBLY, QUANTUM CHIP, AND DEVICE

(71) Applicant: TENCENT TECHNOLOGY (SHENZHEN) COMPANY LTD, Guangdong (CN)

(72) Inventors: Wenlong Zhang, Shenzhen (CN); Maochun Dai, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 642 days.

(21) Appl. No.: 18/078,228

(22) Filed: Dec. 9, 2022

(65) Prior Publication Data
US 2023/0105689 A1 Apr. 6, 2023

Related U.S. Application Data

(63) Continuation of application No. PCT/CN2021/135741, filed on Dec. 6, 2021.

(30) Foreign Application Priority Data

Sep. 26, 2021 (CN) .......................... 202111131811.1

(51) Int. Cl.
*G06N 10/40* (2022.01)
(52) U.S. Cl.
CPC .................................. *G06N 10/40* (2022.01)
(58) Field of Classification Search
CPC ........ G06N 10/40; H10N 60/12; H10N 69/00; H10N 60/0912
See application file for complete search history.

(56) References Cited

U.S. PATENT DOCUMENTS

| 10,381,542 B2 * | 8/2019 | Chang ................. H10N 60/805 |
| 12,408,561 B1 * | 9/2025 | Karabalin ............ H10N 69/00 |

(Continued)

FOREIGN PATENT DOCUMENTS

| CN | 110034228 A | 7/2019 |
| CN | 111554798 A | 8/2020 |

(Continued)

OTHER PUBLICATIONS

International Search Report for PCT/CN2021/135741 dated Apr. 28, 2022 [PCT/ISA/210].

(Continued)

*Primary Examiner* — Nha T Nguyen
(74) *Attorney, Agent, or Firm* — Sughrue Mion, PLLC

(57) ABSTRACT

A qubit assembly preparation method includes preparing a waveguide film in two or more regions on a substrate spaced apart from each other. The method further includes preparing, by using a Dolan bridge photoresist structure, a qubit structure not connected to the waveguide film. The qubit structure includes a three-layer structure. The three-layer structure includes a first superconducting portion and a second superconducting portion intersecting with each other in a coverage region on the substrate. The method further includes removing the insulation layer on a first target region and a second target region of an upper surface of the superconducting portion. The method further includes evaporating a connection layer on the waveguide film, the qubit structure, and the substrate between the waveguide film and the qubit structure.

20 Claims, 17 Drawing Sheets

(56) References Cited

U.S. PATENT DOCUMENTS

| | | | | |
|---|---|---|---|---|
| 2018/0247974 A1* | 8/2018 | Oliver | ................ | H10N 60/0241 |
| 2019/0042967 A1* | 2/2019 | Yoscovits | .......... | H10N 70/8833 |
| 2019/0288176 A1* | 9/2019 | Yoscovits | .............. | G06N 10/40 |
| 2019/0363239 A1* | 11/2019 | Yoscovits | .......... | H10N 60/0912 |
| 2020/0388745 A1* | 12/2020 | Deng | ..................... | H10N 60/12 |
| 2021/0074903 A1* | 3/2021 | Holmes | .............. | H10N 60/0912 |
| 2022/0123195 A1* | 4/2022 | Adiga | .................. | H10N 60/805 |
| 2023/0031455 A1* | 2/2023 | Deng | ................ | H10N 60/0912 |
| 2024/0260487 A1* | 8/2024 | Lee | ........................ | H10N 69/00 |

FOREIGN PATENT DOCUMENTS

| | | |
|---|---|---|
| CN | 112054113 A | 12/2020 |
| WO | 2018/106215 A1 | 6/2018 |

OTHER PUBLICATIONS

Written Opinion for PCT/CN2021/135741 dated Apr. 28, 2022 [PCT/ISA/237].

* cited by examiner

QUBIT ASSEMBLY PREPARATION METHOD, QUBIT ASSEMBLY, QUANTUM CHIP, AND DEVICE

CROSS REFERENCE TO RELATED APPLICATIONS

This application is a continuation of PCT/CN2021/135741 filed on Dec. 6, 2021 and claims priority to Chinese Patent Application No. 202111131811.1, filed on Sep. 26, 2021 in the China Intellectual Property Office, both of which being incorporated by reference herein in their entireties.

FIELD

The disclosure relates to the field of micro-nano processing technologies, and in particular, to a qubit assembly preparation method, a qubit assembly, a quantum chip, and a device.

BACKGROUND

A Josephson junction is a commonly used qubit structure, which may be prepared by using a Dolan bridge photoresist structure.

In the related art, a pattern of a Dolan bridge photoresist structure containing an undercut may be made on a double-layer electron beam photoresist of a surface of a substrate by a method of electron beam exposure, and then the Josephson junction may be prepared by a double-oblique angle evaporation method in which a superconducting metal film is first obliquely evaporated, then oxidized to form an insulation layer, and then a superconducting metal film is vertically evaporated.

Then, in the foregoing preparing the Josephson junction, in order to enable the Josephson junction to communicate with a waveguide film, it is necessary to limit the thickness of the waveguide film, which affects the performance of a prepared qubit assembly.

SUMMARY

According to an aspect of one or more embodiments, there is provided a qubit assembly preparation method comprising preparing a waveguide film in at least two regions on a substrate spaced apart from each other. The method further includes preparing, by using a Dolan bridge photoresist structure, a qubit structure not connected to the waveguide film. The qubit structure includes a three-layer structure. The three-layer structure includes a first superconducting portion and a second superconducting portion intersecting with each other in a coverage region on the substrate. The method further includes removing the insulation layer on a first target region and a second target region of an upper surface of the superconducting portion. The method further includes evaporating a connection layer on the waveguide film, the qubit structure, and the substrate between the waveguide film and the qubit structure.

According to additional aspects of one or more embodiments, there is also provided an apparatus and non-transitory computer readable medium consistent with the qubit assembly preparation method.

BRIEF DESCRIPTION OF THE DRAWINGS

To describe the technical solutions of example embodiments of the disclosure more clearly, the following briefly describes the accompanying drawings required for describing the example embodiments of the disclosure. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
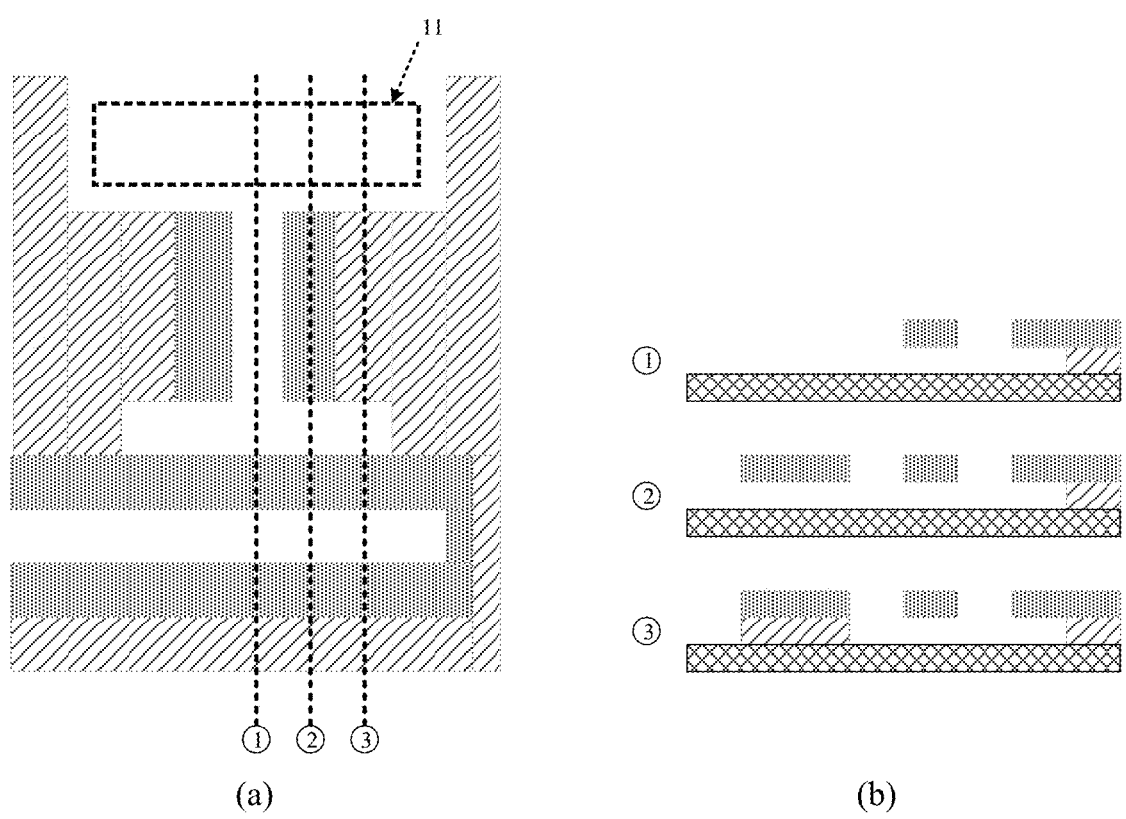
FIG. 1 is a schematic diagram of a Dolan bridge photoresist structure according to an example embodiment the disclosure.

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with the disclosure. On the contrary, the implementations are merely examples of apparatuses and methods that are described in detail in the appended claims and consistent with some example embodiments of the disclosure.

Qubit: A unit of measurement of quantum information in quantum informatics. Unlike conventional bit that can only be in either a 0 state or a 1 state, qubit may be in both the 0 state and the 1 state at the same time, that is, a quantum superposition state of 0 and 1.

Josephson junction: Also referred to as a superconducting tunnel junction. The Josephson junction is generally a structure composed of two superconductors sandwiching a very thin barrier layer (thickness≤a coherence length of Cooper electron pair), such as S (superconductor)-I (semiconductor or insulator)-S (superconductor) structure, referred to as SIS. In the Josephson junction, a superconducting electron can pass from one side to the other side through a semiconductor or insulator film through a tunnel effect.

A superconducting quantum chip is one of important carriers that may be used to study quantum computation. The superconducting quantum chip generally consists of a substrate, a waveguide film (also commonly referred to as a large circuit structure), a qubit structure, and other structures. The main role of the waveguide film is to transmit and control a microwave and electromagnetic field of qubit. Theoretically, considering the loss of the microwave and electromagnetic field, a thickness of the waveguide film is relatively thick, and the device performance, such as a Q value, is better. At present, the qubit structure is mainly the Josephson junction, and the preparation method of the qubit structure, that is, the double-oblique angle evaporation method, restricts a junction region and a thickness of a superconducting layer connected to an external circuit, and thus the thickness of the waveguide film of the large circuit is also limited correspondingly.

A preparation process of the Josephson junction is as follows: A pattern of a structure containing an undercut (also referred to as a Dolan bridge structure) is made on a double-layer electron beam photoresist on a surface of a substrate by an electron beam exposure method, and then a junction region is prepared by a double-oblique angle evaporation method in which a superconducting metal film is first obliquely evaporated, then oxidized to form an oxide insulation layer, and then a superconducting metal film is vertically evaporated.

Embodiments of the disclosure provide a qubit assembly preparation method, a qubit assembly, a quantum chip, and a device, which can improve the performance of the qubit assembly. The technical solution is as follows.

According to an example embodiment, a qubit assembly preparation method is provided, performed by a production line device, the method including:

preparing a waveguide film in at least two regions on a substrate spaced apart from each other, a side surface of the waveguide film being an oblique surface extending outward from a top portion;

preparing, by using a Dolan bridge photoresist structure, a qubit structure not connected to the waveguide film, the qubit structure including a three-layer structure, the three-layer structure including a first superconducting portion and a second superconducting portion intersecting with each other in a coverage region on the substrate, outer surfaces of the first superconducting portion and the second superconducting portion being covered by an insulation layer, and the outer surfaces being surfaces in the first superconducting portion and the second superconducting portion that are not in contact with the substrate;

removing the insulation layer on a first target region of an upper surface of the first superconducting portion and the insulation layer on a second target region of an upper surface of the second superconducting portion, the upper surface being a surface in the outer surfaces of the first superconducting portion and the second superconducting portion that is on another side opposite to a lower surface, and the lower surface being a surface in the outer surfaces of the first superconducting portion and the second superconducting portion that faces the substrate; and evaporating a connection layer on the waveguide film, the qubit structure, and the substrate between the waveguide film and the qubit structure, to obtain a qubit assembly, the connection layer being configured to communicate the first superconducting portion and the second superconducting portion with the waveguide films in different regions.

According to another example embodiment, a qubit assembly is provided, including: a substrate, waveguide films in at least two regions on the substrate spaced apart from each other, a qubit structure, and a connection layer, where a side surface of the waveguide film is an oblique surface extending outward from a top portion;

the qubit structure includes a three-layer structure, the three-layer structure includes a first superconducting portion and a second superconducting portion intersecting with each other in a coverage region on the substrate, and outer surfaces of the first superconducting portion and the second superconducting portion are covered by an insulation layer, the outer surfaces being surfaces in the first superconducting portion and the second superconducting portion that are not in contact with the substrate;

an upper surface of the first superconducting portion has a first target region not covered by the insulation layer, and an upper surface of the second superconducting portion has a second target region not covered by the insulation layer, the upper surface being a surface in the outer surfaces of the first superconducting portion and the second superconducting portion that is on another side opposite to a lower surface, and the lower surface being a surface in the outer surfaces of the first superconducting portion and the second superconducting portion that faces the substrate; and the connection layer covers the waveguide film, the qubit structure, and the substrate between the waveguide film and the qubit structure, and the connection layer is configured to communicate the first superconducting portion and the second superconducting portion with the waveguide films in different regions.

According to still another example embodiment, a quantum chip is provided. The quantum chip includes the foregoing qubit assembly.

According to still another example embodiment, a computer device is provided. The computer device includes the foregoing quantum chip.

According to still another example embodiment, a production line device is provided. The production line device includes an etcher, a mask aligner, and an evaporator. The etcher, the mask aligner, and the evaporator are configured to cooperatively perform the foregoing qubit assembly preparation method.

The technical solutions provided in the embodiments of the disclosure achieve at least the following beneficial effects:

A side surface of a waveguide film is made into an oblique surface, a qubit structure is made into two superconducting portions intersecting with each other in a coverage region on the substrate, and surfaces of the two superconducting portions being covered by an insulation layer. Then, the insulation layer on each target region on a surface of the two superconducting portions is removed, so that a part of the surface of each of the two superconducting portions is exposed in the qubit structure. Subsequently, a connection layer is evaporated to connect the two superconducting portions in the qubit structure to the waveguide films in different regions spaced from each other. In the qubit assembly produced by the foregoing solution, because the waveguide film is connected to the superconducting portion of the qubit assembly through the oblique surface, there is no need to limit the thickness of the waveguide film, and thereby the application range of the qubit assembly may be improved, and the performance of the qubit assembly may be improved.

FIG. 1 is a schematic diagram of a Dolan bridge photoresist structure according to the disclosure. (a) in FIG. 1 is a top view of a Dolan bridge photoresist structure, and (b) in FIG. 1 shows a cross-sectional side view of three sections of ①, ②, and ③. A dashed box 11 is a connection region between the Josephson junction and the external circuit (that is, the waveguide film).

Figure 2:
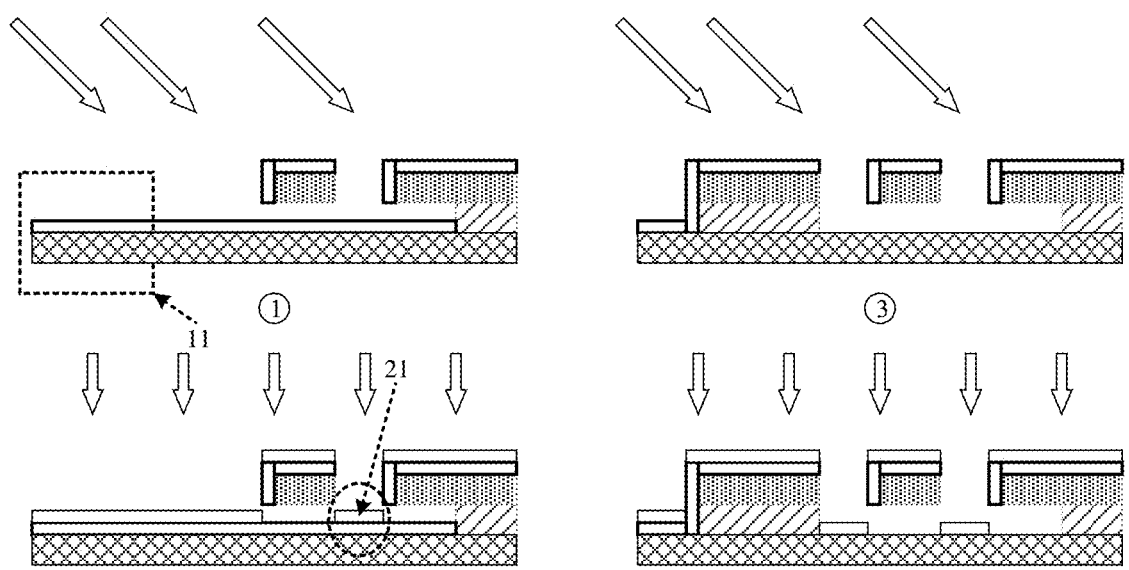
FIG. 2 is a schematic diagram of preparation of a Josephson junction according to an example embodiment the disclosure.

FIG. 2 is a schematic diagram of preparation of a Josephson junction according to the disclosure. Taking the section ① and the section ③ in FIG. 1 as an example, as shown in FIG. 2, a superconducting layer is first evaporated on a substrate through oblique evaporation, and an oxide insulation layer is prepared on a surface of the evaporated superconducting layer, and then another superconducting layer is evaporated on an upper layer of the oxide layer through vertical evaporation. Due to the presence of the Dolan bridge, two different evaporation processes at different oblique angles can form a Josephson junction 21.

Figure 3:
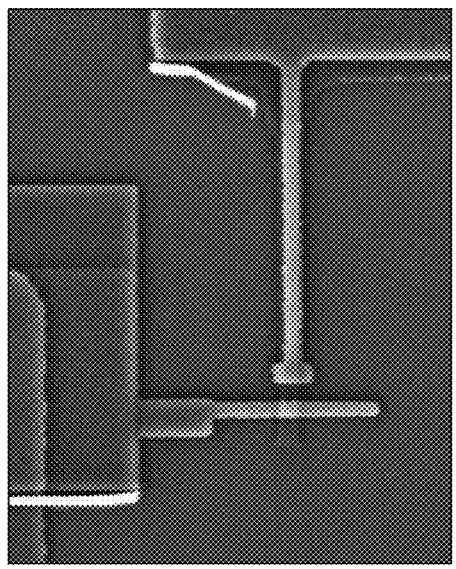
FIG. 3 is a physical diagram of a qubit structure according to an example embodiment the disclosure.

Viewed from the cross-sectional direction of FIG. 2, in two superconducting materials evaporated at different oblique angles, the superconducting material obliquely evaporated is connected to the waveguide film of the external circuit, to ensure that the Josephson junction is in communication with the external circuit. FIG. 3 is a physical diagram of a qubit structure according to the disclosure. As shown in FIG. 3, if viewed from a direction horizontally rotated by 90° from the angle shown in FIG. 2, the part requiring vertical evaporation is in contact with the waveguide film of the external circuit.

As mentioned above, increasing the thickness of the waveguide film can improve the performance of superconducting qubit. However, in the evaporation solution shown in FIG. 2, the thickness of the waveguide film cannot be increased, which brings a great obstacle to the performance improvement of the quantum chip. Based on the Dolan bridge photoresist structure shown in FIG. 1, the part where the qubit structure is connected to the external circuit waveguide is made in the process of vertical evaporation of double-oblique angle evaporation.

Figure 4:
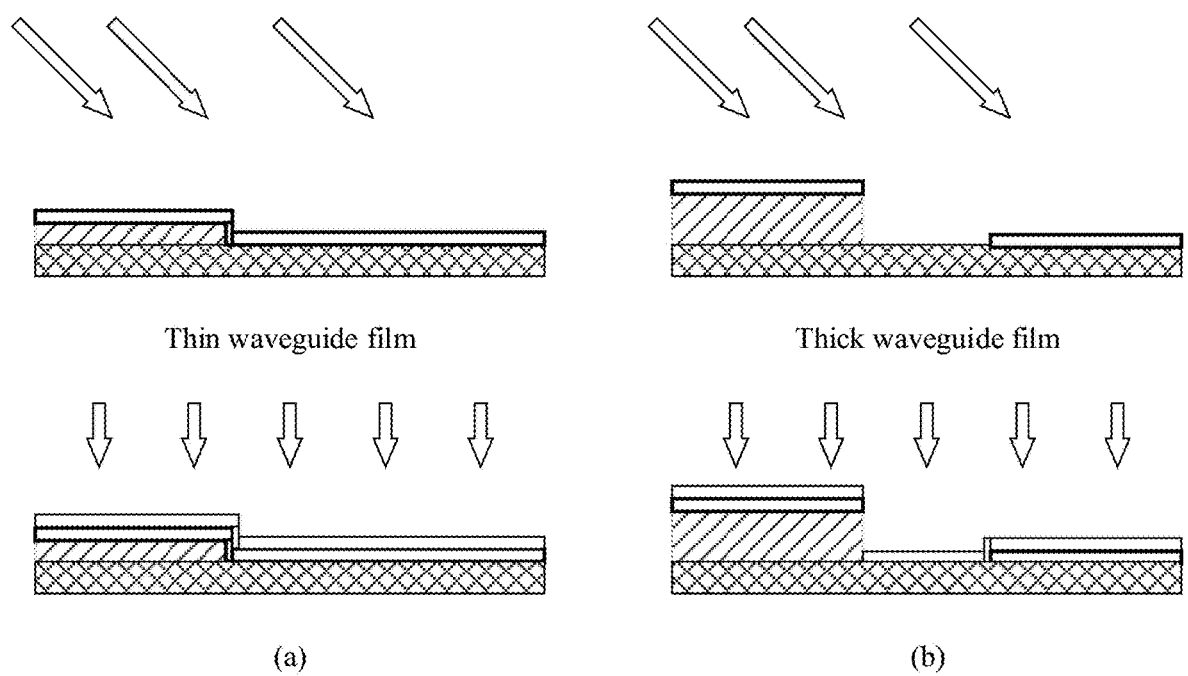
FIG. 4 is a schematic diagram of evaporation corresponding to waveguide films with different thicknesses according to an example embodiment the disclosure.

For example, FIG. 4 is a schematic diagram of evaporation corresponding to waveguide films with different thicknesses according to the disclosure. The region shown in FIG. 4 is the region marked by the dashed box 11 in FIG. 1 (that is, the region where the waveguide film is connected to the Josephson junction). As shown in (a) of FIG. 4, when the waveguide film is thin, an oblique coating film may be better connected to the waveguide, and after preparing the insulation layer and performing the vertical evaporation, the oblique evaporation part may be ensured to be in communication with the waveguide film. As shown in (b) of FIG. 4, when the waveguide film is thick, the part of the superconducting film that is obliquely evaporated cannot be in contact with the waveguide. Because the insulation layer is prepared thereafter, the waveguide film cannot be in communication with the obliquely evaporated superconducting film even if the vertically evaporated superconducting film is in contact with the waveguide film. In addition, if the thick waveguide film is not properly processed, the sidewall thereof is relatively vertical, and thereby the area of superconducting material in contact with the waveguide film is very small after the vertical evaporation, which is prone to poor contact.

In order to improve the performance of the qubit assembly with a structure of Josephson junction, a new qubit assembly preparation solution is provided in subsequent embodiments of the disclosure.

Figure 5:
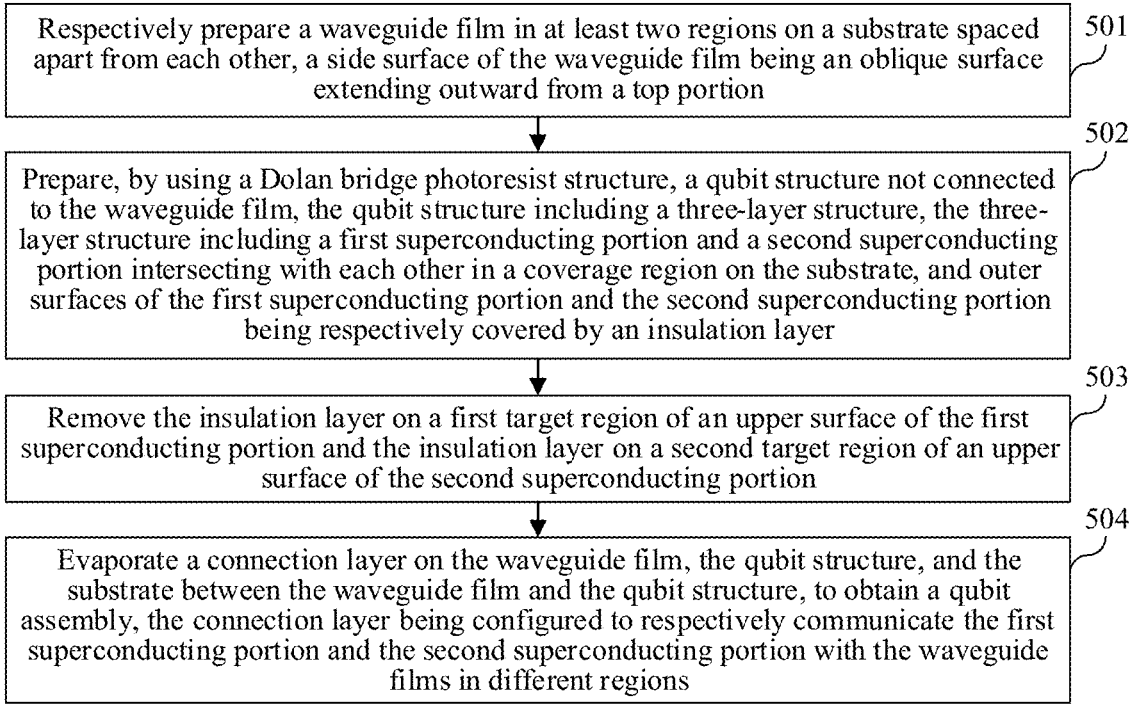
FIG. 5 is a method flowchart of a qubit assembly preparation method according to an example embodiment of the disclosure.

FIG. 5 is a method flowchart of a qubit assembly preparation method according to an exemplary embodiment of the disclosure. As shown in FIG. 5, the method may include the following operations:

Operation 501: prepare a waveguide film in at least two regions on a substrate spaced apart from each other, a side surface of the waveguide film being an oblique surface extending outward from a top portion.

The waveguide is a structure used to direct an electromagnetic wave.

The waveguide film is a structure in which a layer of material is evaporated on a wafer, and then a specific graphic is formed by a micromachining method. The film used to transmit the electromagnetic wave is the waveguide film. This film structure is also sometimes referred to as a "large circuit" structure.

In some embodiments of the disclosure, a waveguide film whose side surface is an oblique surface may first be prepared on a substrate on which a qubit device is prepared.

Figure 6:
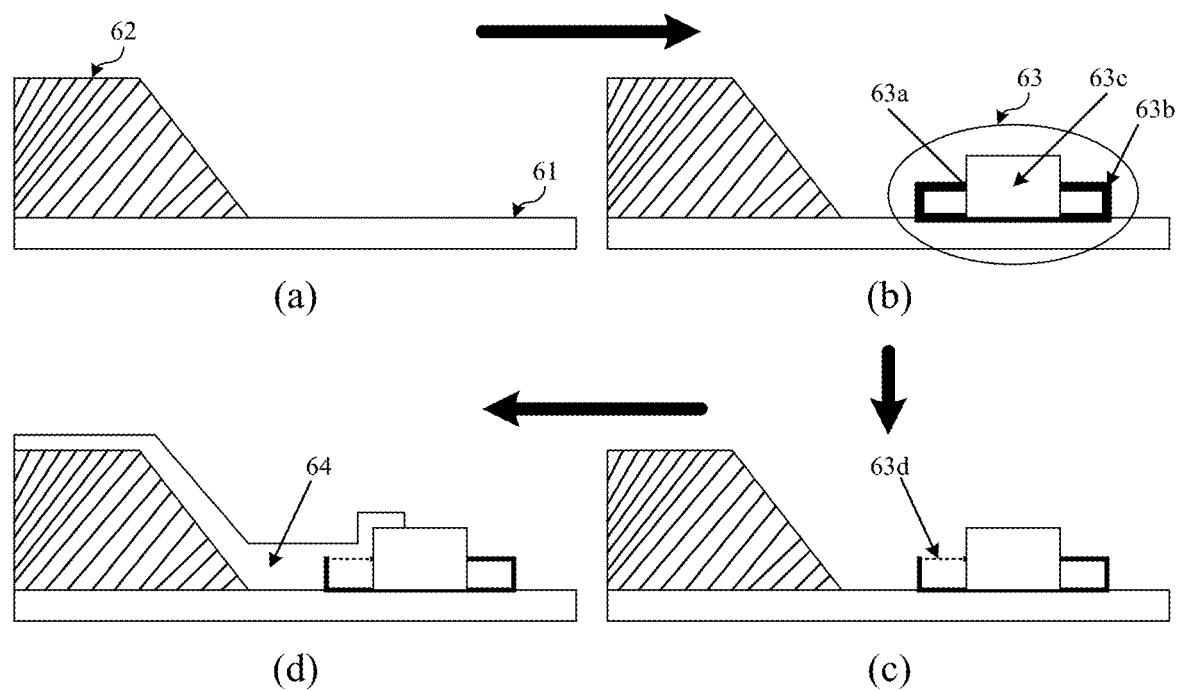
FIG. 6 is a flowchart of preparation of a qubit assembly according to the example embodiment shown in FIG. 5.

For example, FIG. 6 is a flowchart of preparation of a qubit assembly according to an exemplary embodiment of the disclosure. As shown in (a) of FIG. 6, a waveguide film 62 having an oblique surface is first prepared on a substrate 61. The cross-sectional structure of the waveguide film 62 is narrow in a top part and wide in a bottom part, and the oblique surface extends outward from a top end of the waveguide film 62 until it is in contact with the substrate 61.

Operation 502: Prepare, by using a Dolan bridge photoresist structure, a qubit structure not connected to the waveguide film, the qubit structure including a three-layer structure, the three-layer structure including a first superconducting portion and a second superconducting portion intersecting with each other in a coverage region on the substrate, and outer surfaces of the first superconducting portion and the second superconducting portion being covered by an insulation layer. The outer surfaces are surfaces in the first superconducting portion and the second superconducting portion that are not in contact with the substrate.

The qubit structure is located in an extension direction of the oblique surface of the waveguide film. That is, there is a section of substrate exposed between the oblique surface of the waveguide film and the qubit structure.

In some embodiments of the disclosure, the qubit structure is a Josephson junction, that is, the qubit structure is a superconducting-insulator-superconducting structure, and the first superconducting portion and the second superconducting portion are isolated by an insulation layer. The qubit structure may be prepared by using a Dolan bridge photoresist structure.

The Dolan bridge photoresist structure is a photoresist structure used to prepare the Josephson junction.

For example, as shown in (b) of FIG. 6, after the waveguide film 62 having the oblique surface is prepared on the substrate 61, a qubit structure 63 having a structure of Josephson junction is prepared on the substrate 61 by using a Dolan bridge, and the qubit structure 63 is not connected to the waveguide film 62. The qubit structure 63 includes three portions, namely a first superconducting portion 63a of the lower half of the qubit structure 63, an insulation layer 63b, and a second superconducting portion 63c of the upper half of the qubit structure 63. The insulation layer 63b covers surfaces in the first superconducting portion 63a and the second superconducting portion 63c that are not in contact with the substrate. The first superconducting portion 63a and second superconducting portion 63c are two superconducting portions that intersect with each other in the coverage region on the substrate.

Figure 7:
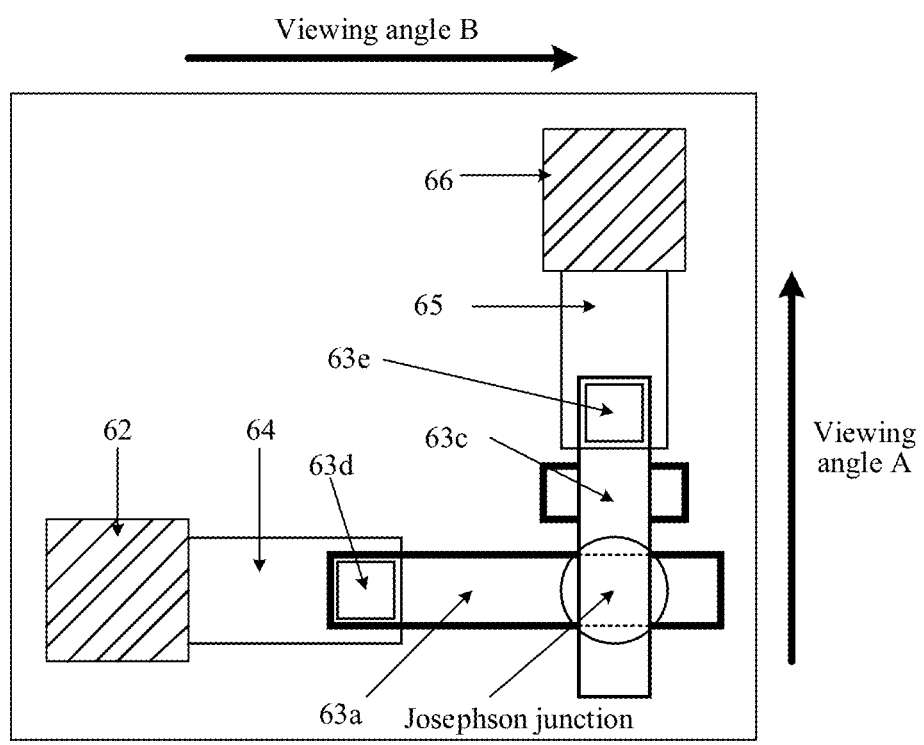
FIG. 7 is a top view of a qubit structure according to the example embodiment shown in FIG. 5.

For example, the first superconducting portion 63a and the second superconducting portion 63c are elongated superconducting portions. FIG. 7 is a top view of a qubit structure according to some embodiments of the disclosure. As shown in FIG. 7, the first superconducting portion 63a and the second superconducting portion 63c constitute a Josephson junction at the intersection, and FIG. 6 is a diagram of the qubit structure viewed at a viewing angle A from a downward direction.

In some embodiments of the disclosure, coverage positions of the first superconducting portion and the second superconducting portion on the substrate are intersecting, and the first superconducting portion and the second superconducting portion overlap at the intersection. The first superconducting portion and second superconducting portion may have an intersection direction of being perpendicular to each other. In some embodiments, an intersection angle of the first superconducting portion and the second superconducting portion may be greater than or less than 90 degrees. The embodiments of the disclosure do not limit the intersection angle of the first superconducting portion and the second superconducting portion.

Operation 503: Remove the insulation layer on a first target region of an upper surface of the first superconducting portion and the insulation layer on a second target region of an upper surface of the second superconducting portion.

The upper surface is a surface in the outer surfaces of the first superconducting portion and the second superconducting portion that is on another side opposite to a lower surface, and the lower surface is a surface in the outer surfaces of the first superconducting portion and the second superconducting portion that faces the substrate.

The first target region is all or part of a region on the upper surface of the first superconducting portion, except a region corresponding to the second superconducting portion. Correspondingly, the second target region is all or part of a region on the upper surface of the second superconducting portion, except a region corresponding to the first superconducting portion.

In some embodiments of the disclosure, because the first superconducting portion and the second superconducting portion intersect with each other, a part of the upper surface of the first superconducting portion is blocked by the second superconducting portion, and the remaining part is exposed. In this regard, in some embodiments of the disclosure, the insulation layer on a partial region (that is, the first target region) of the exposed region of the upper surface of the first superconducting portion is removed, so that the position of the first superconducting portion corresponding to the first target region is not covered by the insulation layer. Correspondingly, the solution shown in some embodiments of the disclosure further removes the insulation layer on a partial region (that is, the second target region) of the upper surface of the second superconducting portion.

For example, in (c) of FIG. 6 and in FIG. 7, the insulation layer corresponding to a first target region 63d of the upper surface of the first superconducting portion 63a is removed, so that a portion of the first superconducting portion 63a that corresponds to the lower part of the first target region 63d is exposed. In FIG. 7, the insulation layer corresponding to a second target region 63e of the upper surface of the second superconducting portion 63c is also removed.

Operation 504: Evaporate a connection layer on the waveguide film, the qubit structure, and the substrate between the waveguide film and the qubit structure, to obtain a qubit assembly, the connection layer being configured to communicate the first superconducting portion and the second superconducting portion with the waveguide films in different regions.

For example, refer to FIG. 3 and FIG. 6. FIG. 6 corresponds to a schematic diagram of a qubit assembly preparation region from the viewing angle viewed in the down direction of FIG. 3. Combined with the qubit structure shown in FIG. 3, where the Josephson junction is connected to the upper and left external circuits. On the left side of the Josephson junction, the connection layer is connected to the waveguide film corresponding to the left external circuit and the first superconducting portion. On the upper side of the Josephson junction, the connection layer is connected to the waveguide film corresponding to the upper external circuit and the second superconducting portion.

Referring to FIG. 7, a connection layer 64 covers the waveguide film 62 and the first target region 63d. Because the insulation layer at the first target region 63d is removed, the connection layer 64 may communicate the waveguide film 62 with the first superconducting portion 63a. Similarly, a connection layer 65 covers a waveguide film 66 and the second target region 63e. Because the insulation layer at the second target region 63e is removed, the connection layer 65 may communicate the waveguide film 66 with the second superconducting portion 63c.

In some embodiments of the disclosure, after the insulation layer is removed through operation 503, both the first superconducting portion and the second superconducting portion have an exposed portion. In this case, after the connection layer composed of the superconducting material is evaporated on the waveguide film, the qubit structure, and the substrate between the waveguide film and the qubit structure, the connection layer may communicate the waveguide films, communicate the waveguide film with the qubit structure, and communicate the waveguide film with the exposed position in the first superconducting portion and the second superconducting portion, so that the waveguide films in different regions are in communication with the first superconducting portion and the second superconducting portion.

For example, in (d) of FIG. 6, the connection layer 64, as an integral superconducting layer, communicates the waveguide film 62 with the first superconducting portion 63a. Because the side surface of the waveguide film 62 facing the qubit structure 63 is an oblique surface, the entire oblique surface of the waveguide film 62 may be covered by the connection layer 64 only through evaporation, so that the waveguide film 62 and the first superconducting portion in the qubit structure 63 are fully connected, and additionally, it is not necessary to limit the thickness of the waveguide film 62.

In conclusion, the side surface of the waveguide film is made into an oblique surface, the qubit structure is made into two superconducting portions intersecting with each other in the coverage region on the substrate, and the surfaces of the two superconducting portions are covered by an insulation layer. Then, the insulation layer on each target region on a surface of the two superconducting portions is removed, so that a part of the surface of each of the two superconducting portions is exposed in the qubit structure. Subsequently, a connection layer is evaporated to connect the two superconducting portions in the qubit structure to the different waveguide films spaced from each other. In the qubit assembly produced by the foregoing solution, because the waveguide film is connected to the superconducting portion of the qubit assembly through the oblique surface, there is no need to limit the thickness of the waveguide film, and thereby the application range of the qubit assembly may be improved, and the performance of the qubit assembly may be improved.

Figure 8:
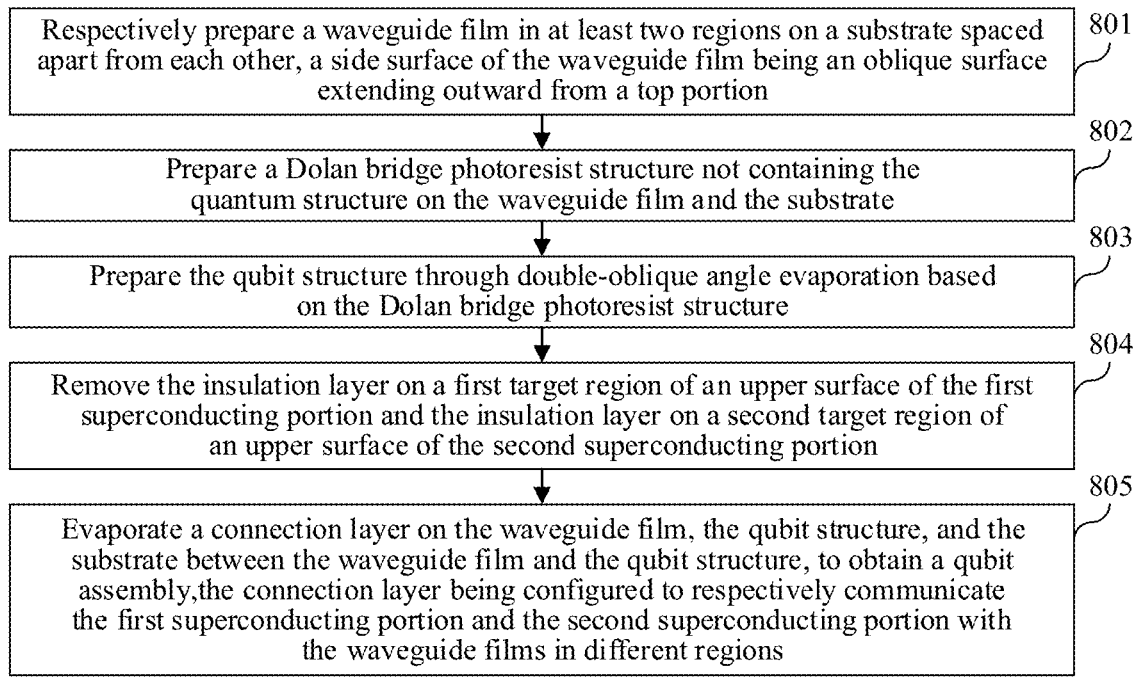
FIG. 8 is a method flowchart of a qubit assembly preparation method according to an example embodiment of the disclosure.

FIG. 8 is a method flowchart of a qubit assembly preparation method according to an exemplary embodiment of the disclosure. As shown in FIG. 8, the method may include the following operations:

Operation 801: Prepare a waveguide film in at least two regions on a substrate spaced apart from each other, a side surface of the waveguide film being an oblique surface extending outward from a top portion.

In a possible implementation, the process of preparing a waveguide film in at least two regions on a substrate spaced apart from each other includes:

evaporating a first superconducting material on the substrate;

applying first photoresist onto the first superconducting material;

removing the first photoresist in an etching region through photolithography development;

performing wet etching on the first superconducting material in the etching region; and performing cleaning to remove the first photoresist, to obtain the waveguide film.

Figure 9:
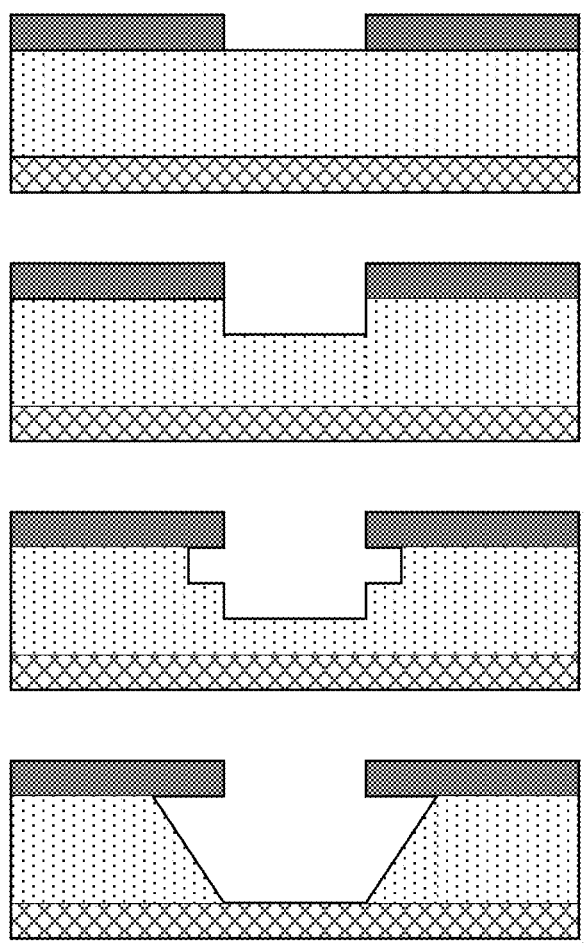
FIG. 9 is a schematic diagram of wet etching according to the example embodiment shown in FIG. 8.

In the field of micro-nano processing technologies, etching may be divided into dry etching and wet etching. The wet etching is anisotropic. That is, in the wet etching process with a mask, the etching starts from an upper surface of a material to be etched, and the material to be etched has a certain thickness, and thus after etching is performed for a certain thickness, an etching solution contacts a sidewall of the material to be etched at a position of an etching pattern, and lateral etching occurs. This phenomenon is also referred to as drilling. The oblique angle of the sidewall due to drilling may be referred to as the "sidewall angle". FIG. 9 is a schematic diagram of wet etching according to some embodiments of the disclosure. In some embodiments of the disclosure, a waveguide film having an oblique surface may be prepared through wet etching, thereby providing an achievable manner for preparing a waveguide film having an oblique surface, and reducing the manufacturing difficulty of the waveguide film having the oblique surface.

Figure 10:
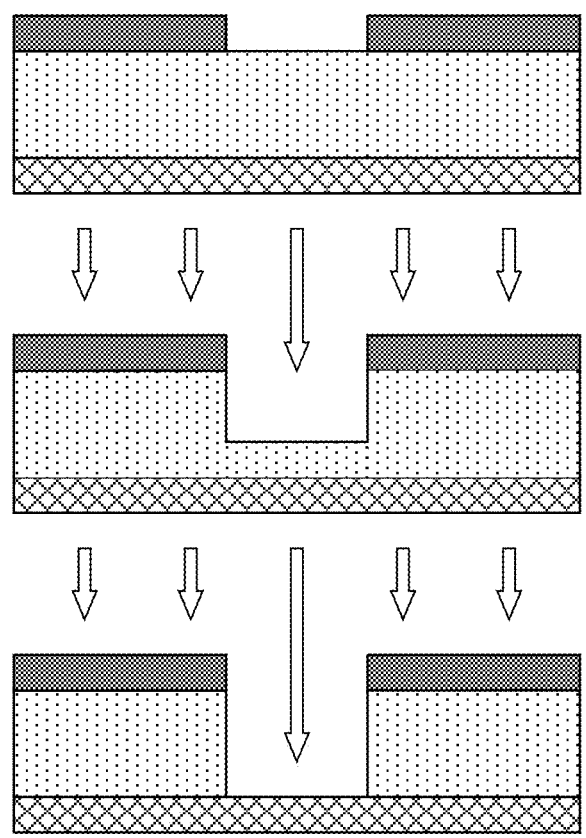
FIG. 10 is a schematic diagram of dry etching according to the example embodiment shown in FIG. 8.

The dry etching is anisotropic etching, and thus there is no obvious drilling phenomenon. For example, refer to FIG. 10. FIG. 10 shows a schematic diagram of dry etching according to some embodiments of the disclosure.

In some embodiments of the disclosure, an oblique angle of the side surface of the waveguide film ranges from 20° to 70°. The solution shown in some embodiments of the disclosure limits the range of the oblique angle of the waveguide film side surface, thereby ensuring the performance of the superconducting connection between the waveguide film and the qubit structure.

Operation 802: Prepare a Dolan bridge photoresist structure not containing the qubit structure on the waveguide film and the substrate.

In some embodiments of the disclosure, the process of preparing a Dolan bridge photoresist structure not containing the qubit structure on the waveguide film and the substrate may include:

applying second photoresist onto the waveguide film and the substrate;

applying third photoresist onto the second photoresist; and performing exposure development and fixation processing on the second photoresist and the third photoresist, to obtain the Dolan bridge photoresist structure.

In some embodiments of the disclosure, a Dolan bridge photoresist structure may be prepared on the substrate on which the waveguide film is prepared through performing exposure development and fixation processing on two layers of photoresist, and thereby an achievable solution for preparing a Dolan bridge structure is provided, where the Dolan bridge photoresist structure prepared in this case does not contain the qubit structure, and does not contain the connection layer between the qubit structure and the waveguide film.

Operation 803: Prepare the qubit structure through double-oblique angle evaporation based on the Dolan bridge photoresist structure.

In some embodiments of the disclosure, an achievable solution is provided in which a qubit structure that intersects in a coverage region on a substrate is prepared through a Dolan bridge photoresist structure combining a double-oblique angle evaporation manner.

The qubit structure includes a three-layer structure, the three-layer structure includes a first superconducting portion and a second superconducting portion intersecting with each other in a coverage region on the substrate, and an insulation layer between the first superconducting portion and the second superconducting portion. The first superconducting portion is located below the second superconducting portion. The insulation layer covers outer surfaces of the first superconducting portion and the second superconducting portion.

In some embodiments of the disclosure, the process of preparing the qubit structure through double-oblique angle evaporation based on the Dolan bridge photoresist structure may include:

vertically evaporating a second superconducting material based on the Dolan bridge photoresist structure, to obtain the first superconducting portion;

preparing the insulation layer on the surface of the first superconducting portion;

obliquely evaporating the second superconducting material based on the Dolan bridge photoresist structure; and performing cleaning to remove the Dolan bridge photoresist structure and the second superconducting material on the Dolan bridge photoresist structure, to obtain the qubit structure.

In some embodiments of the disclosure, after preparing the Dolan bridge photoresist structure, the bottom layer (that is, the first superconducting portion) of the qubit structure may be prepared through vertical evaporation first, then an insulation layer is prepared on a bottom layer of the qubit structure to cover the bottom layer of the qubit structure, and then an upper layer (that is, the second superconducting portion) of the qubit structure is prepared on the bottom layer of the qubit structure through oblique evaporation. Due to the presence of the Doran Bridge, the second superconducting portion of the qubit structure overlaps the first superconducting portion at the intersection, and thus the upper surface of the first superconducting portion is not entirely covered, so that the part of the insulation layer on the upper surface of the first superconducting portion in the lower half of the qubit structure, except the part of the Josephson junction, is exposed.

After performing cleaning to remove the Dolan bridge photoresist structure and the second superconducting material on the Dolan bridge photoresist structure, an insulation layer may be prepared on the second superconducting portion, to obtain the qubit structure. That is, the solution shown in some embodiments of the disclosure proposes a manner of performing vertical evaporation and then oblique evaporation, to implement preparation of the qubit structure.

The manner of preparing the insulation layer on the surface of the second superconducting portion may be similar to the manner of preparing the insulation layer on the surface of the first superconducting portion. In some embodiments, when the second superconducting portion is an easily oxidized material (such as aluminum), the second superconducting portion may be directly exposed to air for natural oxidation, to obtain the insulation layer covering the second superconducting portion.

In a possible implementation, an oblique angle of the oblique evaporation ranges from 20° to 70°. The solution shown in some embodiments of the disclosure defines the oblique angle of the oblique evaporation, so that the preparation effect of the second superconducting portion.

In a possible implementation, a thickness of the waveguide film is greater than that of the qubit structure.

Because the waveguide film has an oblique surface, the thickness of the waveguide film need not be limited to the thickness of the qubit structure, that is, full communication with the qubit structure may be implemented.

Operation 804: Remove the insulation layer on a first target region of an upper surface of the first superconducting portion and the insulation layer on a second target region of an upper surface of the second superconducting portion. The first target region is all or part of a region on the upper surface of the first superconducting portion, except a region corresponding to the second superconducting portion (that is, a region in which the Josephson junction is located). The second target region is all or part a region on the upper surface of the second superconducting portion, except a region corresponding to the first superconducting portion.

In a possible implementation, the process of removing the insulation layer on a first target region of an upper surface of the first superconducting portion and the insulation layer on a second target region of an upper surface of the second superconducting portion may include:

applying fourth photoresist onto the waveguide film, the qubit structure, and the substrate between the waveguide film and the qubit structure;

processing the fourth photoresist in a photolithography development and fixation manner, to make the first target region of the upper surface of the first superconducting portion exposed and make the second target region of the upper surface of the second superconducting portion exposed;

performing etching processing on the first target region of the upper surface of the first superconducting portion, to remove the insulation layer on the first target region of the upper surface of the first superconducting portion; and performing etching processing on the second target region of the upper surface of the second superconducting portion, to remove the insulation layer on the second target region of the upper surface of the second superconducting portion.

In the solution shown in some embodiments of the disclosure, the insulation layer is removed from the upper surface of the first superconducting portion and the second superconducting portion through combining photolithography development and etching, thereby providing an achievable solution for removing the insulation layer from the upper surface of the two superconducting portions of the qubit structure.

Operation 805: Evaporate a connection layer on the waveguide film, the qubit structure, and the substrate between the waveguide film and the qubit structure, to obtain a qubit assembly, the connection layer being configured to communicate the first superconducting portion and the second superconducting portion with the waveguide films in different regions.

In some embodiments of the disclosure, after removing the insulation layer on the first target region and the second target region, a part of the upper surface of the first superconducting portion is exposed. Correspondingly, a part of the upper surface of the second superconducting portion is also exposed. In this case, by evaporating the connection layer, the communication of the different waveguide films with the first superconducting portion and with the second superconducting portion may be implemented.

In a possible implementation, a material of the first superconducting portion is the same as that of the second superconducting portion; and a material of the connection layer is the same as or different from that of the first superconducting portion or the second superconducting portion.

In the solution shown in some embodiments of the disclosure, the materials of the two superconducting portions and the connection layer are defined, which ensures the performance of the superconducting circuit.

Figure 11:
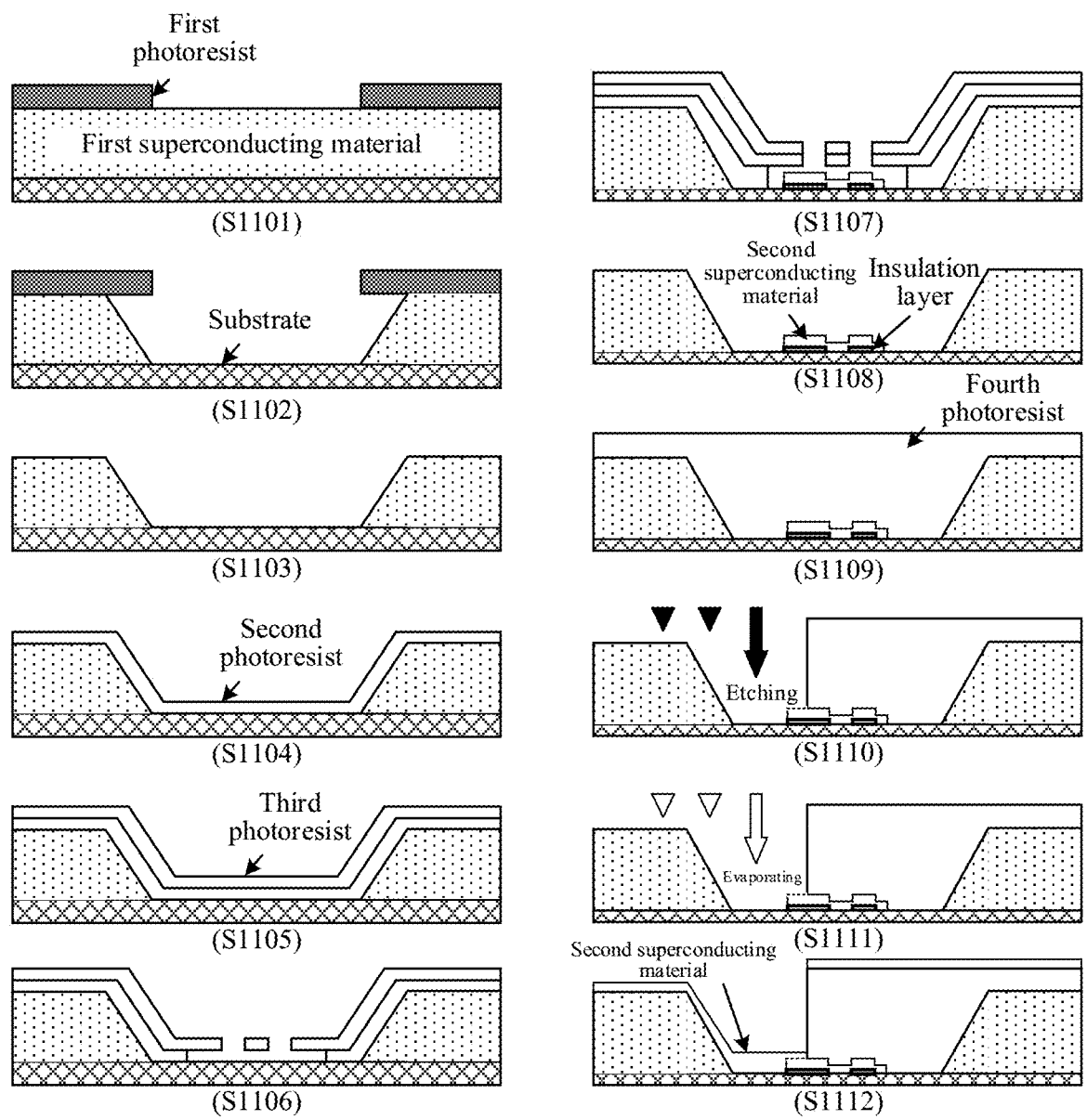
FIG. 11 is a flowchart of preparation of a qubit assembly according to the example embodiment shown in FIG. 8.

FIG. 11 is a flowchart of preparation of a qubit assembly according to some embodiments of the disclosure. In a viewing angle of the qubit structure from left to right in FIG. 7 (that is, a viewing angle B in FIG. 7), the connection structure of the second superconducting portion and the waveguide film is prepared as an example. As shown in FIG. 11, the preparation procedure of the qubit assembly may be as follows:

S1101: Apply first photoresist onto a substrate with a thick waveguide film evaporated, and defining an etching region by a method of photolithography development after performing first baking.

The thick waveguide film in operation S1101 may be a first superconducting material, such as tantalum, aluminum, and niobium.

A temperature of the first baking may be a soft baking temperature of the first photoresist.

The first photoresist may be a positive photoresist or a negative photoresist.

The photolithography manner may be UV exposure or laser direct writing.

The developing solution is tetramethylammonium hydroxide (TMAH) or TMAH diluent.

For example, in this operation, AZ6112 photoresist may be applied onto a sample deposited with thick waveguide aluminum, and the sample may be left at 100° C. for a period of time. Then, the sample is put into a laser direct writing device, and a graphic is written with specific parameters. Then, the sample is placed in 2.38% TMAH solution to develop for a period of time, and then placed in deionized water for fixation.

S1102: Place the sample processed through S1101 in an etching solution of the waveguide material at a certain temperature, a sidewall of the etched waveguide material presenting a "slope" at a specific angle as wet etching is isotropic and generates drilling.

In operation S1102, the certain temperature may range from 20° C. to 90° C.

The specific angle is 20° to 70°, which may be 45°, for example.

For example, in this operation, the sample obtained in S1101 may be placed in an aluminum etching solution, kept at 23° C. to react for a period of time and then taken out, and placed in the deionized water for cleaning, to obtain a thick waveguide sample with a sidewall angle of 45°.

S1103: Clean the first photoresist on the sample in S1102 using a photoresist stripping solution.

In operation S1103, the photoresist stripping solution includes a photoresist stripping solution of the first photoresist, acetone, iso-propyl alcohol (IPA), N-methylpyrrolidone (NMP), Remover PG (a dedicated photoresist stripping agent for NMP groups).

For example, in this operation, the sample obtained in operation S1102 may be placed in NMP for photoresist stripping.

S1104: Apply second photoresist and perform second baking on the sample in S1103, the layer of photoresist defining an undercut structure.

In operation S1104, the second photoresist may be an electron beam photoresist, methacrylic acid (MAA), or the like.

A temperature of the second baking may be a soft baking temperature of the second photoresist.

For example, in this operation, MAA photoresist may be applied onto the sample obtained in operation S1103, and the sample may be baked at 160° C. for 10 min.

S1105: Apply third photoresist and perform third baking on the sample in S1104, the layer of photoresist defining a qubit structure.

In operation S1105, the third photoresist may be an electron beam photoresist or PMMA.

A temperature of the third baking is a soft baking temperature of the third photoresist.

For example, polymethyl methacrylate (PMMA) photoresist may be applied onto the sample obtained in operation S1104, and the sample may be baked at 160° C. for 10 min.

S1106: Perform exposure development and fixation processing on the sample in S1105 to obtain a Dolan bridge photoresist structure, the Dolan bridge photoresist structure in the disclosure not including a part where the qubit structure is connected to an external circuit waveguide, which is different from a conventional structure.

In operation S1106, the exposure manner may be an electron beam exposure.

The developing solution may be methyl isobutyl ketone (MIBK), or a mixture of MIBK and IPA.

The fixing solution may be IPA.

Figure 12:
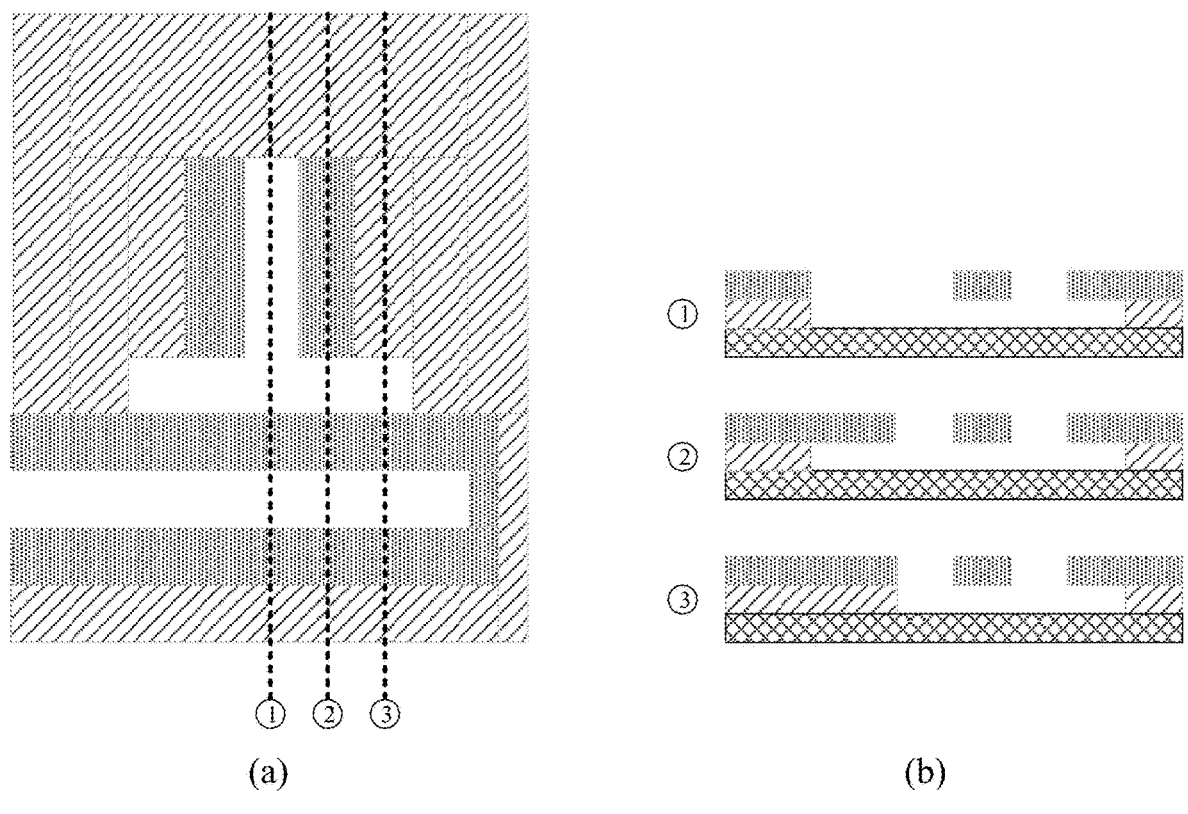
FIG. 12 shows a top view and a cross-sectional side view of a Dolan bridge according to the example embodiment shown in FIG. 8.

The Dolan bridge photoresist structure formed in this operation which does not include the part where the qubit structure is connected to the external circuit waveguide refers to FIG. 12. FIG. 12 shows a top view and a cross-sectional side view of a Dolan bridge photoresist structure according to some embodiments of the disclosure.

For example, in this operation, the sample obtained in operation S1105 may be placed in an electron beam exposure machine to be exposed at a certain dose, then removed and placed in a developing solution with MIBK:IPA of 1:3 for development, and then placed in IPA for fixation, to thereby obtain a Dolan bridge structure.

S1107: Perform double-oblique angle evaporation on the sample in S1106: a. vertically evaporating a second superconducting material; b. preparing an insulation layer; and c. obliquely evaporating the second superconducting material at a certain angle.

In operation S1107, the evaporation method includes electron beam evaporation, magnetic sputtering, thermal evaporation, or the like. The used device may include a double-oblique angle multi-chamber coating machine.

The insulation layer may be an oxide layer.

The method for preparing the insulation layer may include dynamic oxygen oxidation or static constant-pressure oxygen oxidation in a vacuum chamber, or the like.

The oblique angle of the oblique evaporation is 20° to 70°, and the second superconducting material may be aluminum, tantalum, niobium, and the like.

For example, in this operation, the sample obtained in operation S1106 may be placed in the double-oblique angle multi-chamber evaporation coating machine, aluminum with a thickness of 30 nm may be vertically evaporated first, and then the sample may be statically oxidized, so that an oxide insulation layer is formed on an aluminum surface. Then, aluminum with a thickness of 30 nm may be obliquely evaporated onto the sample, to form a structure of Josephson junction.

S1108. Clean the sample in S1107 with a photoresist stripping solution, to obtain a structure in which qubits and a thick waveguide film are contained but not connected to each other.

In operation S1108, the photoresist stripping solution may include acetone, NMP, Remover PG, or the like.

For example, in this operation, the sample obtained in operation S1107 may be placed in NMP for photoresist stripping.

S1109: Apply fourth photoresist and perform fourth baking on the sample in S1108, the layer of photoresist defining a part where the qubit structure is connected to the external circuit.

In operation S1109, the fourth photoresist may be a positive photoresist, a negative photoresist, or a combination of multiple-layer photoresist, or may be a photoresist of the same class as the first photoresist.

A temperature of the fourth baking is a soft baking temperature of the fourth photoresist.

For example, in this operation, AZ6112 photoresist may be applied onto a surface of the sample obtained in operation S1108, and then the sample may be baked at 100° C. for a period of time.

S1110: Perform photolithography development and fixation on the sample in S1109 to obtain a corresponding defined pattern, and then remove, by an etching method, the insulation layer in the exposed portion generated by the second superconducting material in operation S1107.

In operation S1110, the photolithography method may include UV exposure, laser direct writing, or the like.

The developing solution may be tetramethylammonium hydroxide (TMAH) or TMAH diluent.

The etching method includes physical and/or reactive etching, and the etching device may include an ion beam etcher, a dry etcher, and the like.

For example, in this operation, the sample obtained in operation S1109 may be placed in a laser direct writing device to write a graphic, then placed in a TMAH developing solution at a concentration of 2.38% for development, and then placed in the deionized water for fixation, to obtain a graphic of a connection region. Then, the sample is placed in an ion beam etcher to perform an argon ion physical etching, to remove the oxide insulation layer with a thickness of about 5 nm on the surface of the connection region portion to which the two layers of aluminum evaporated in operation S1107 are exposed.

S1111: Evaporate the sample in S1110 with the second superconducting material (which may, in some embodiments, be a superconducting material other than the second superconducting material) to communicate the qubit structure with the thick waveguide film of the external circuit.

In operation S1111, the evaporation method may include electron beam evaporation, magnetic sputtering, thermal evaporation, or the like.

For example, in this operation, the sample obtained in operation S1110 may be placed in an electron beam evaporation coating machine, and aluminum with a thickness of 100 nm may be evaporated, to thereby connect the Josephson junction to the waveguide film layer.

S1112: Peel off the sample in S1111 by using a photoresist stripping solution, and finally obtain a qubit sample of the thick waveguide film.

The photoresist stripping solution may include acetone, NMP, Remover PG, or the like.

For example, in this operation, the sample obtained in operation S1111 may be placed in NMP to be soaked and peeled off, to finally obtain a qubit sample of the thick waveguide film.

The solution shown in some embodiments of the disclosure may solve the problems in the solution shown in FIG. 2 that the obliquely evaporated film cannot be in contact with the thick waveguide film; the contact area of the evaporated superconducting material with the thick waveguide is too small, resulting in poor contact; two layers of material for the oblique evaporation and vertical evaporation may not be able to communicate with the waveguide film of the external circuit, and other problems.

Figure 13:
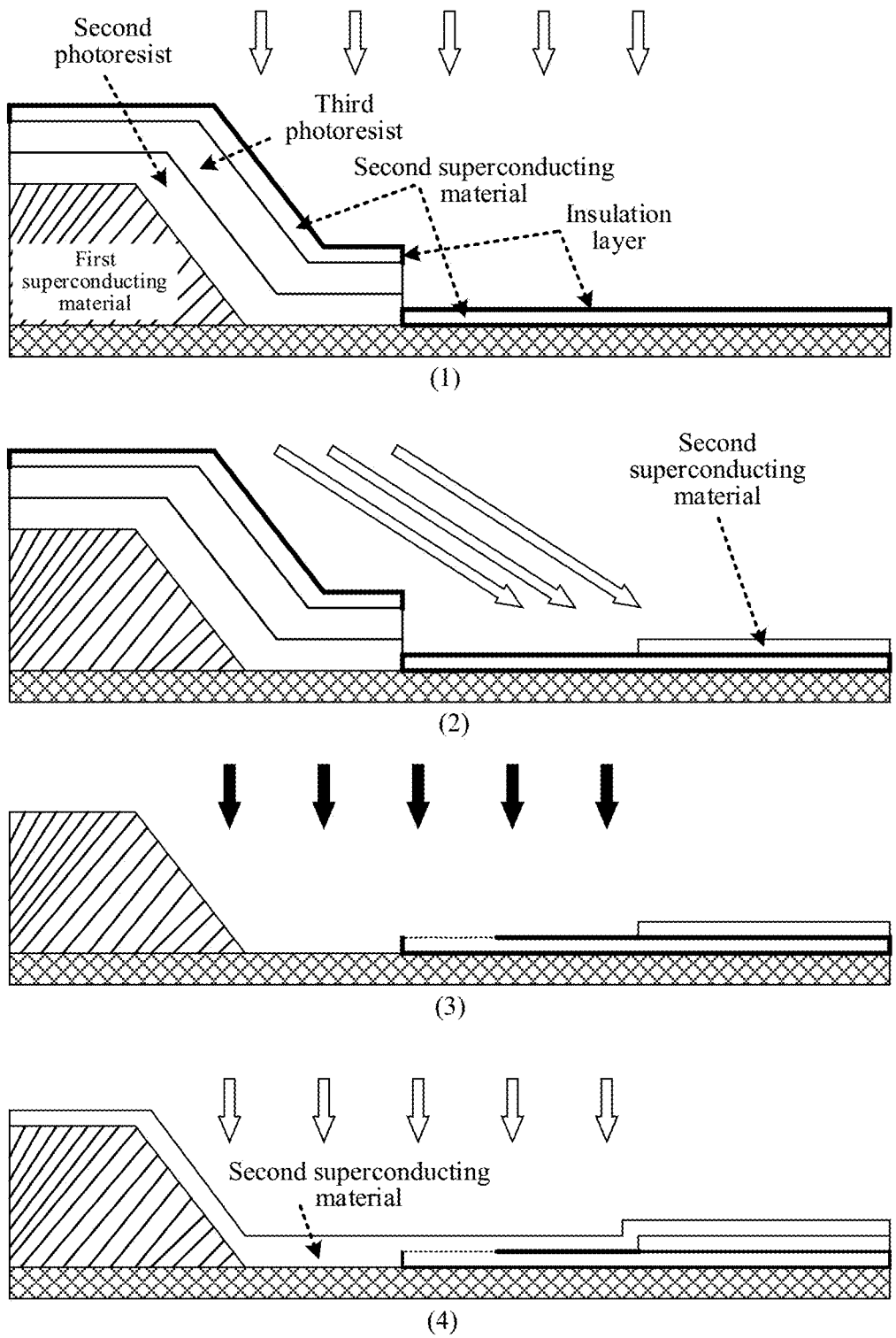
FIG. 13 is a diagram of a qubit assembly preparation principle according to the example embodiment shown in FIG. 8.

FIG. 13 is a diagram of a qubit assembly preparation principle according to some embodiments of the disclosure. As shown in FIG. 13, when a qubit structure is prepared, vertical evaporation is first performed ((1) in FIG. 13), and then after an insulation layer is prepared, oblique evaporation is performed ((2) in FIG. 13). In this way, after the processing, it may be found that the upper surfaces of both the vertical evaporation and the oblique evaporation film are partially exposed. After photoresist stripping, ion etching is performed ((3) in FIG. 13), the insulation layer in the exposed portion is etched off. After exposure development, a superconducting material is evaporated onto the exposed portion and the thick waveguide film portion, so that both films may be communicated with the outside ((4) in FIG. 13). Meanwhile, because the sidewall of the thick waveguide film is made into an oblique surface (such as an oblique surface at an angle of 45°) by wet etching, the area of a connection portion is entirely covered, and good connectivity may be achieved.

In conclusion, the side surface of the waveguide film is made into an oblique surface, the qubit structure is made into two superconducting portions intersecting with each other in the coverage region on the substrate, and the surfaces of the two superconducting portions are covered by an insulation layer. Then, the insulation layer on each target region on a surface of the two superconducting portions is removed, so that a part of the surface of each of the two superconducting portions is exposed in the qubit structure. Subsequently, a connection layer is evaporated to connect the two superconducting portions in the qubit structure to the different waveguide films spaced from each other. In the qubit assembly produced by the foregoing solution, because the waveguide film is connected to the superconducting portion of the qubit assembly through the oblique surface, there is no need to limit the thickness of the waveguide film, and thereby the application range of the qubit assembly may be improved, and the performance of the qubit assembly may be improved.

Figure 14:
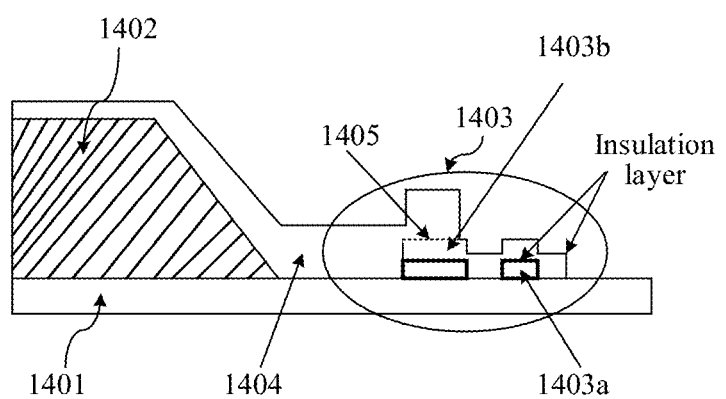
FIG. 14 is a schematic structural diagram of a qubit assembly according to an example embodiment of the disclosure.
Figure 15:
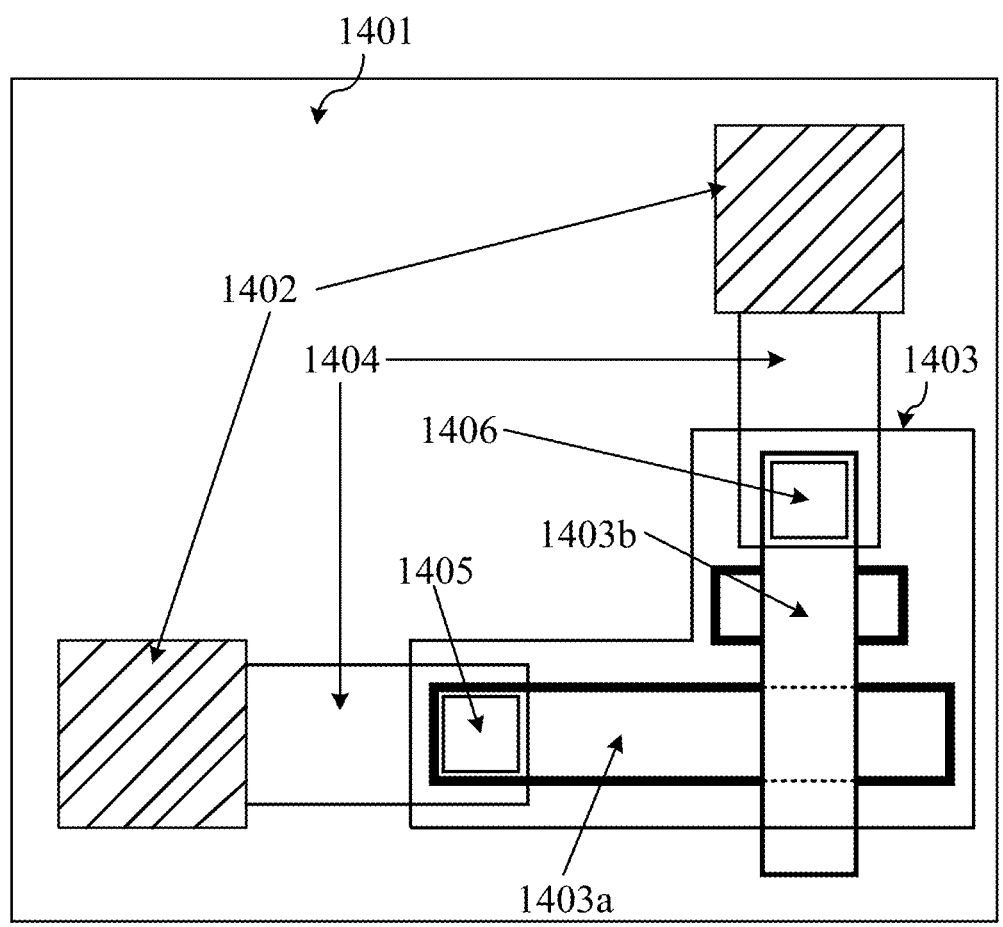
FIG. 15 is a side view of a qubit assembly according to an example embodiment of the disclosure.

FIG. 14 is a top view of a structure of a qubit assembly shown in an exemplary embodiment of the disclosure. FIG. 15 is a side view of a qubit assembly according to an exemplary embodiment of the disclosure. FIG. 15 is a side view of a qubit assembly shown in FIG. 14 viewed from left to right.

As shown in FIG. 14 and FIG. 15, the qubit assembly includes: a substrate 1401, waveguide films 1402 in at least two regions on the substrate spaced apart from each other, a qubit structure 1403, and a connection layer 1404.

A side surface of the waveguide film 1402 is an oblique surface extending outward from a top portion.

The qubit structure 1403 includes a first superconducting portion 1403*a* and a second superconducting portion 1403*b* intersecting with each other in a coverage region on the substrate. Outer surfaces of the first superconducting portion 1403*a* and the second superconducting portion 1403*b* are covered by an insulation layer, the outer surfaces being surfaces in the first superconducting portion and the second superconducting portion that are not in contact with the substrate.

An upper surface of the first superconducting portion 1403*a* has a first target region 1405 not covered by the insulation layer, and an upper surface of the second superconducting portion has a second target region 1406 not covered by the insulation layer. The upper surface is a surface in the outer surfaces of the first superconducting portion and the second superconducting portion that is on another side opposite to a lower surface. The lower surface is a surface in the outer surfaces of the first superconducting portion and the second superconducting portion that faces the substrate.

The connection layer 1404 covers the waveguide film 1402, the qubit structure 1403, and the substrate 1401 between the waveguide film 1402 and the qubit structure 1403. The connection layer 1404 is used to communicate the first superconducting portion 1403*a* and the second superconducting portion 1403*b* with the waveguide films in different regions.

In a possible implementation, a thickness of the waveguide film is greater than that of the qubit structure.

In a possible implementation, an oblique angle of the waveguide film side surface ranges from 20° to 70°.

The qubit assembly shown in FIG. 14 may be prepared through the preparation procedure shown in FIG. 5 or FIG. 8, and details are not described herein again.

In conclusion, in the solution of some embodiments of the disclosure, because the waveguide film is connected to the superconducting portion in the qubit assembly through the oblique surface, there is no need to limit the thickness of the waveguide film, and thereby the application range of the qubit assembly may be improved, and the performance of the qubit assembly may be improved.

In an exemplary embodiment of the disclosure, a quantum chip is further provided. The quantum chip includes the qubit assembly shown in FIG. 14.

In an exemplary embodiment of the disclosure, a computer device includes the quantum chip. The quantum chip includes the qubit assembly shown in FIG. 14.

Figure 16:
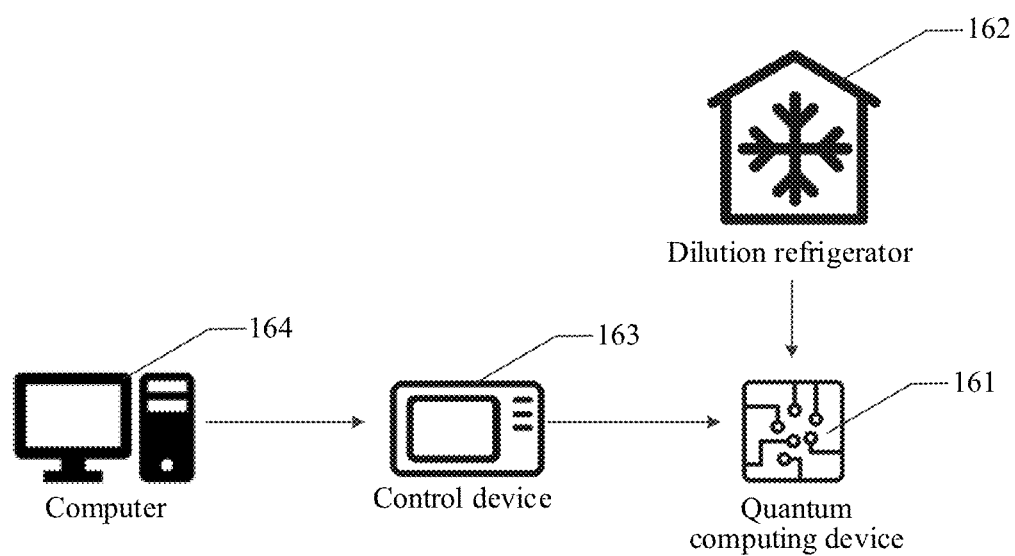
FIG. 16 is a schematic diagram of an application scenario of a solution according to an example embodiment of the disclosure.

FIG. 16 is a schematic diagram of an application scenario of a solution according to an example embodiment of the disclosure. As shown in FIG. 16, the application scenario may be a superconducting quantum computing platform. The application scenario includes: a quantum computing device 161, a dilution refrigerator 162, a control device 163, and a computer 164.

The quantum computing device 161 is a circuit acting on a physical qubit, and the quantum computing device 161 may be implemented as a quantum chip such as a superconducting quantum chip at around absolute zero. The dilution refrigerator 162 is configured to provide an environment at absolute zero for the superconducting quantum chip.

The control device 163 is configured to control the quantum computing device 161, and the computer 164 is configured to control the control device 163. For example, a programmed quantum program is compiled into an instruction by using software in the computer 164 and transmitted to the control device 163 (for example, an electronic/microwave control system), and the control device 163 transforms the instruction into an electronic/microwave control signal and inputs the electronic/microwave control signal into the dilution refrigerator 162, to control superconducting qubits at a temperature of less than 10 mK. A reading process is opposite to the above, and a read waveform is transmitted to the quantum computing device 161.

Figure 17:
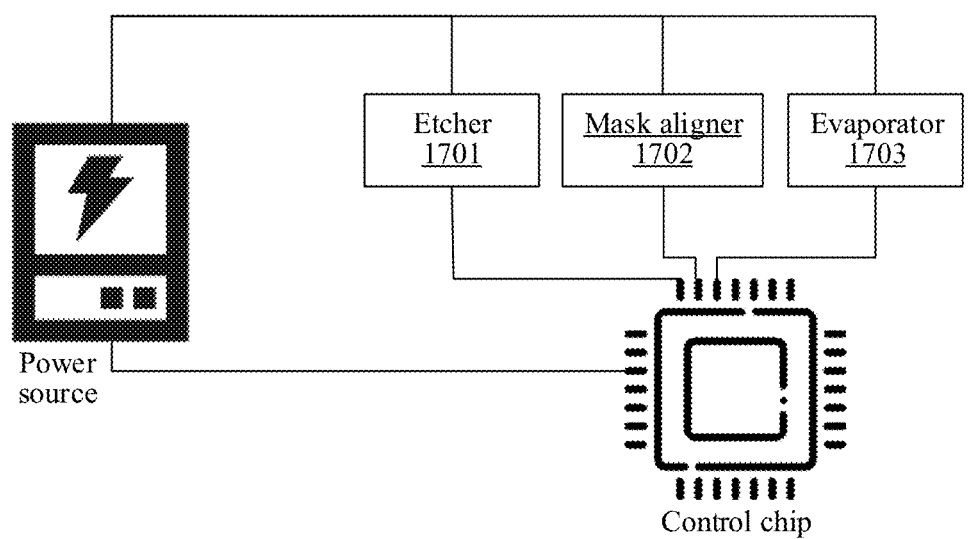
FIG. 17 is a schematic diagram of a production line device according to an example embodiment of the disclosure.

FIG. 17 is a schematic diagram of a production line device according to an exemplary embodiment of the disclosure. As shown in FIG. 17, the production line device includes: an etcher 1701, a mask aligner 1702, and an evaporator 1703. The etcher 1701, the mask aligner 1702, and the evaporator 1703 are configured to cooperatively perform the following operations:

preparing a waveguide film in at least two regions on a substrate spaced apart from each other, a side surface of the waveguide film being an oblique surface extending outward from a top portion;

preparing, by using a Dolan bridge photoresist structure, a qubit structure not connected to the waveguide film, the qubit structure including a three-layer structure, the three-layer structure including a first superconducting portion and a second superconducting portion intersecting with each other in a coverage region on the substrate, and an insulation layer between the first superconducting portion and the second superconducting portion, outer surfaces of the first superconducting portion and the second superconducting portion being covered by an insulation layer, and the outer surfaces being surfaces in the first superconducting portion and the second superconducting portion that are not in contact with the substrate;

removing the insulation layer on a first target region of an upper surface of the first superconducting portion and the insulation layer on a second target region of an upper surface of the second superconducting portion, the upper surface being a surface in the outer surfaces of the first superconducting portion and the second superconducting portion that is on another side opposite to a lower surface, and the lower surface being a surface in the outer surfaces of the first superconducting portion and the second superconducting portion that faces the substrate; and evaporating a connection layer on the waveguide film, the qubit structure, and the substrate between the waveguide film and the qubit structure, to obtain a qubit assembly, the connection layer being configured to communicate the first superconducting portion and the second superconducting portion with the waveguide films in different regions.

In a possible implementation, the etcher, the mask aligner, and the evaporator are configured to prepare a waveguide film in at least two regions on a substrate, a side surface of the waveguide film being an oblique surface extending outward from a top portion.

The mask aligner and the evaporator are configured to prepare, by using a Dolan bridge photoresist structure, a qubit structure not connected to the waveguide film, the qubit structure including a three-layer structure, the three-layer structure including a first superconducting portion and a second superconducting portion intersecting with each other, an insulation layer between the first superconducting portion and the second superconducting portion, and outer surfaces of the first superconducting portion and the second superconducting portion being covered by an insulation layer.

The etcher and the mask aligner are configured to remove the insulation layer on a first target region of an upper surface of the first superconducting portion and the insulation layer on a second target region of an upper surface of the second superconducting portion.

The mask aligner and the evaporator are configured to evaporate a connection layer on the waveguide film, the qubit structure, and the substrate between the waveguide film and the qubit structure, to obtain a qubit assembly, the connection layer being configured to communicate the first superconducting portion and the second superconducting portion with the waveguide films in different regions.

In a possible implementation, the evaporator is configured to evaporate a first superconducting material on the substrate.

The mask aligner is configured to apply first photoresist onto the first superconducting material; and remove the first photoresist in an etching region through photolithography development.

The etcher is configured to perform wet etching on the first superconducting material in the etching region; and perform cleaning to remove the first photoresist, to obtain the waveguide films in at least two regions.

In a possible implementation, the mask aligner is configured to prepare a Dolan bridge photoresist structure not containing the qubit structure on the waveguide film and the substrate.

The evaporator is configured to prepare the qubit structure through double-oblique angle evaporation based on the Dolan bridge photoresist structure.

In a possible implementation, the mask aligner is configured to:

apply second photoresist onto the waveguide film and the substrate;

apply third photoresist onto the second photoresist; and perform exposure development and fixation processing on the second photoresist and the third photoresist, to obtain the Dolan bridge photoresist structure.

In a possible implementation, the evaporator is configured to:

vertically evaporate a second superconducting material based on the Dolan bridge photoresist structure, to obtain the first superconducting portion;

prepare the insulation layer on the surface of the first superconducting portion;

obliquely evaporate the second superconducting material based on the Dolan bridge photoresist structure; and perform cleaning to remove the Dolan bridge photoresist structure and the second superconducting material on the Dolan bridge photoresist structure, to obtain the qubit structure.

In a possible implementation, an inclination angle of the oblique evaporation ranges from 20° to 70°.

In a possible implementation, the mask aligner is configured to apply fourth photoresist onto the waveguide film, the qubit structure, and the substrate between the waveguide film and the qubit structure; and process the fourth photoresist in a photolithography development and fixation manner, to expose the first target region and the second target region.

The etcher is configured to perform etching processing on the first target region and the second target region, to remove the insulation layer on the first target region and the insulation layer on the second target region.

In a possible implementation, a material of the first superconducting portion is the same as that of the second superconducting portion; and a material of the connection layer is the same as or different from that of the first superconducting portion or the second superconducting portion.

In a possible implementation, a thickness of the waveguide film is greater than that of the qubit structure.

In a possible implementation, an oblique angle of the waveguide film side surface ranges from 20° to 70°.

The process of preparing the qubit assembly by the etcher 1701, the mask aligner 1702, and the evaporator 1703 may refer to the descriptions in the embodiments shown in FIG. 5 or FIG. 8, and details are not described herein again.

The evaporator 1703 may have the function of preparing the insulation layer on the surface of the superconducting portion, to implement the operation of preparing the insulation layer on the surface of the superconducting portion in the embodiment shown in FIG. 8.

In some embodiments, the production line device further includes a processor. The processor may be electrically connected to the etcher 1701, the mask aligner 1702, and the evaporator 1703, to control the etcher 1701, the mask aligner 1702, the evaporator 1703, and the like.

In some embodiments, the production line device further includes a power source, configured to supply power to the processor, the etcher 1701, the mask aligner 1702, the evaporator 1703, and other electrical devices.

In some embodiments, the spatial connection between the various machines is made by a conveyor belt, or the movement of a preparation object between the various machines is completed based on a robotic arm.

In some embodiments, the production line device further includes a memory. The memory may be configured to store at least one computer instruction. The processor executes the at least one computer instruction, to cause the production line device to perform the foregoing qubit assembly preparation method.

In conclusion, in the solution shown in some embodiments of the disclosure, the side surface of the waveguide film is made into an oblique surface, the qubit structure is made into two superconducting portions intersecting with each other in the coverage region on the substrate, and the surfaces of the two superconducting portions are covered by an insulation layer. Then, the insulation layer on each target region on a surface of the two superconducting portions is removed, so that a part of the surface of each of the two superconducting portions is exposed in the qubit structure. Subsequently, a connection layer is evaporated to connect the two superconducting portions in the qubit structure to the different waveguide films spaced from each other. In the qubit assembly produced by the foregoing solution, because the waveguide film is connected to the superconducting portion of the qubit assembly through the oblique surface, there is no need to limit the thickness of the waveguide film, and thereby the application range of the qubit assembly may be improved, and the performance of the qubit assembly may be improved.

In an exemplary embodiment, a computer-readable storage medium is further provided. The computer-readable storage medium stores at least one computer instruction, and the at least one computer instruction, when executed by a processor in a production line device, causes the production line device to perform the foregoing qubit assembly preparation method.

In an exemplary embodiment, a computer program product or a computer program is further provided. The computer program product or the computer program includes computer instructions, and the computer instructions are stored in a computer-readable storage medium. A processor of a production line device reads the computer instructions from the computer-readable storage medium, and executes the computer instructions to cause the production line device to perform the foregoing qubit assembly preparation method.

Other embodiments of the disclosure will be apparent to a person skilled in the art after considering the specification and practicing the invention that is disclosed herein. The disclosure is intended to cover any variations, uses or adaptive changes of the disclosure. The variations, uses or adaptive changes follow the general principles of the disclosure, and include well-known knowledge and conventional technical means in the art that are not disclosed in the disclosure. The specification and the embodiments are merely for an illustration purpose, and the actual scope and spirit of the disclosure are subject to the claims.

It is to be understood that the disclosure is not limited to the precise structures described above and shown in the accompanying drawings, and various modifications and changes may be made without departing from the scope of the disclosure. The scope of the disclosure is limited only by the appended claims.

What is claimed is:

1. A qubit assembly preparation method comprising:
preparing a waveguide film in at least two regions on a substrate spaced apart from each other, a side surface of the waveguide film being an oblique surface extending outward from a top portion;
preparing, by using a Dolan bridge photoresist structure, a qubit structure not connected to the waveguide film, the qubit structure comprising a three-layer structure, the three-layer structure comprising a first superconducting portion and a second superconducting portion intersecting with each other in a coverage region on the substrate, outer surfaces of the first superconducting portion and the second superconducting portion being covered by an insulation layer, and the outer surfaces being surfaces in the first superconducting portion and the second superconducting portion that are not in contact with the substrate;
removing the insulation layer on a first target region of an upper surface of the first superconducting portion and the insulation layer on a second target region of an upper surface of the second superconducting portion, the upper surface being a surface in the outer surfaces of the first superconducting portion and the second superconducting portion that is on another side opposite to a lower surface, and the lower surface being a surface in the outer surfaces of the first superconducting portion and the second superconducting portion that faces the substrate; and evaporating a connection layer on the waveguide film, the qubit structure, and the substrate between the waveguide film and the qubit structure, to obtain a qubit assembly, the connection layer being configured to communicate the first superconducting portion and the second superconducting portion with the waveguide films.

2. The method according to claim 1, wherein the preparing the waveguide film comprises:
evaporating a first superconducting material on the substrate;
applying first photoresist onto the first superconducting material;
removing the first photoresist in an etching region through photolithography development;
performing wet etching on the first superconducting material in the etching region; and
performing cleaning to remove the first photoresist, to obtain the waveguide films in at least two regions.

3. The method according to claim 1, wherein the preparing the qubit structure comprises:
preparing a Dolan bridge photoresist structure not comprising the qubit structure on the waveguide film and the substrate; and
preparing the qubit structure through double-oblique angle evaporation based on the Dolan bridge photoresist structure.

4. The method according to claim 3, wherein the preparing the Dolan bridge photoresist structure comprises:
applying second photoresist onto the waveguide film and the substrate;
applying third photoresist onto the second photoresist.

5. The method according to claim 3, wherein the preparing the Dolan bridge photoresist structure comprises:
performing exposure development and fixation processing on the second photoresist and the third photoresist, to obtain the Dolan bridge photoresist structure.

6. The method according to claim 3, wherein the preparing the qubit structure comprises:
vertically evaporating a second superconducting material based on the Dolan bridge photoresist structure, to obtain the first superconducting portion;
preparing the insulation layer on the surface of the first superconducting portion.

7. The method according to claim 3, wherein the preparing the qubit structure comprises:
obliquely evaporating the second superconducting material based on the Dolan bridge photoresist structure; and
performing cleaning to remove the Dolan bridge photoresist structure and the second superconducting material on the Dolan bridge photoresist structure, to obtain the qubit structure.

8. The method according to claim 5, wherein an oblique angle of the oblique evaporation ranges from 20° to 70°.

9. The method according to claim 1, wherein the removing the insulation layer comprises:
applying fourth photoresist onto the waveguide film, the qubit structure, and the substrate between the waveguide film and the qubit structure;
processing the fourth photoresist in a photolithography development and fixation manner, to expose the first target region and the second target region.

10. The method according to claim 1, wherein the removing the insulation layer comprises:
performing etching processing on the first target region and the second target region, to remove the insulation layer on the first target region and the insulation layer on the second target region.

11. A qubit assembly comprising:
a substrate;
waveguide films in at least two regions on the substrate spaced apart from each other and having at least one side surface, the side surface of at least one waveguide film being an oblique surface extending outward from a top portion;
a qubit structure comprising a three-layer structure, the three-layer structure comprises a first superconducting portion and a second superconducting portion intersecting with each other in a coverage region on the substrate, and outer surfaces of the first superconducting portion and the second superconducting portion are covered by an insulation layer, the outer surfaces being surfaces in the first superconducting portion and the second superconducting portion that are not in contact with the substrate, an upper surface of the first superconducting portion having a first target region not covered by the insulation layer, and an upper surface of the second superconducting portion having a second target region not covered by the insulation layer, the upper surface being a surface in the outer surfaces of the first superconducting portion and the second superconducting portion that is on another side opposite to a lower surface, and the lower surface being a surface in the outer surfaces of the first superconducting portion and the second superconducting portion that faces the substrate; and
a connection layer covering the waveguide film, the qubit structure, and the substrate between the waveguide film and the qubit structure, the connection layer being configured to communicate the first superconducting portion and the second superconducting portion with the waveguide films.

12. The qubit assembly according to claim 11, wherein a thickness of the waveguide film is greater than that of the qubit structure.

13. The qubit assembly according to claim 11, wherein an oblique angle of the side surface of the waveguide film ranges from 20° to 70°.

14. A production line device comprising:
an etcher;
a mask aligner; and
an evaporator;
wherein the etcher, the mask aligner, and the evaporator are configured to perform a qubit assembly preparation method comprising:
preparing a waveguide film in at least two regions on a substrate spaced apart from each other, a side surface of the waveguide film being an oblique surface extending outward from a top portion;
preparing, by using a Dolan bridge photoresist structure, a qubit structure not connected to the waveguide film, the qubit structure comprising a three-layer structure, the three-layer structure comprising a first superconducting portion and a second superconducting portion intersecting with each other in a coverage region on the substrate, outer surfaces of the first superconducting portion and the second superconducting portion being covered by an insulation layer, and the outer surfaces being surfaces in the first superconducting portion and the second superconducting portion that are not in contact with the substrate;

removing the insulation layer on a first target region of an upper surface of the first superconducting portion and the insulation layer on a second target region of an upper surface of the second superconducting portion, the upper surface being a surface in the outer surfaces of the first superconducting portion and the second superconducting portion that is on another side opposite to a lower surface, and the lower surface being a surface in the outer surfaces of the first superconducting portion and the second superconducting portion that faces the substrate; and evaporating a connection layer on the waveguide film, the qubit structure, and the substrate between the waveguide film and the qubit structure, to obtain a qubit assembly, the connection layer being configured to communicate the first superconducting portion and the second superconducting portion with the waveguide films.

15. The production line device according to claim 14, wherein the mask aligner and the evaporator are configured to prepare, by using a Dolan bridge photoresist structure, a qubit structure not connected to the waveguide film, the qubit structure comprising a three-layer structure, the three-layer structure comprising a first superconducting portion and a second superconducting portion intersecting with each other in a coverage region on the substrate, outer surfaces of the first superconducting portion and the second superconducting portion being covered by an insulation layer, and the outer surfaces being surfaces in the first superconducting portion and the second superconducting portion that are not in contact with the substrate;

the etcher and the mask aligner are configured to remove the insulation layer on a first target region of an upper surface of the first superconducting portion and the insulation layer on a second target region of an upper surface of the second superconducting portion, the upper surface being a surface in the outer surfaces of the first superconducting portion and the second superconducting portion that is on another side opposite to a lower surface, and the lower surface being a surface in the outer surfaces of the first superconducting portion and the second superconducting portion that faces the substrate; and the mask aligner and the evaporator are configured to evaporate a connection layer on the waveguide film, the qubit structure, and the substrate between the waveguide film and the qubit structure, to obtain a qubit assembly, the connection layer being configured to communicate the first superconducting portion and the second superconducting portion with the waveguide films in different regions.

16. The production line device according to claim 15, wherein the evaporator is configured to evaporate a first superconducting material on the substrate;

the mask aligner is configured to apply first photoresist onto the first superconducting material, and remove the first photoresist in an etching region through photolithography development; and the etcher is configured to perform wet etching on the first superconducting material in the etching region, and perform cleaning to remove the first photoresist, to obtain the waveguide films in at least two regions.

17. The production line device according to claim 15, wherein the mask aligner is configured to prepare a Dolan bridge photoresist structure not comprising the qubit structure on the waveguide film and the substrate; and the evaporator is configured to prepare the qubit structure through double-oblique angle evaporation based on the Dolan bridge photoresist structure.

18. The production line device according to claim 17, wherein the mask aligner is configured to:

apply second photoresist onto the waveguide film and the substrate;

apply third photoresist onto the second photoresist; and perform exposure development and fixation processing on the second photoresist and the third photoresist, to obtain the Dolan bridge photoresist structure.

19. The production line device according to claim 17, wherein the evaporator is configured to:

vertically evaporate a second superconducting material based on the Dolan bridge photoresist structure, to obtain the first superconducting portion;

prepare the insulation layer on the surface of the first superconducting portion;

obliquely evaporate the second superconducting material based on the Dolan bridge photoresist structure; and perform cleaning to remove the Dolan bridge photoresist structure and the second superconducting material on the Dolan bridge photoresist structure, to obtain the qubit structure.

20. The production line device according to claim 17, wherein the mask aligner is configured to apply fourth photoresist onto the waveguide film, the qubit structure, and the substrate between the waveguide film and the qubit structure, and process the fourth photoresist in a photolithography development and fixation manner, to expose the first target region and the second target region; and the etcher is configured to perform etching processing on the first target region and the second target region, to remove the insulation layer on the first target region and the insulation layer on the second target region.

* * * * *